US006609095B1

(12) United States Patent
Krause

(10) Patent No.: US 6,609,095 B1
(45) Date of Patent: Aug. 19, 2003

(54) ELECTRONIC FINANCIAL ACCOUNTING SYSTEM

(76) Inventor: Paul D. Krause, 157 Valley Cir., Rochester, NY (US) 14622

( * ) Notice: Subject to any disclaimer, the term of this patent is extended or adjusted under 35 U.S.C. 154(b) by 0 days.

(21) Appl. No.: 09/488,982

(22) Filed: Jan. 21, 2000

(51) Int. Cl.[7] .............................................. G10L 21/00
(52) U.S. Cl. ...................................................... 704/270
(58) Field of Search .......................... 705/39, 42, 33; 704/270, 272, 275

(56) References Cited

U.S. PATENT DOCUMENTS

| | | | | |
|---|---|---|---|---|
| 4,222,109 A | * | 9/1980 | Siwula ........................ 705/33 |
| 4,724,527 A | | 2/1988 | Nishimura et al. |
| 4,910,696 A | | 3/1990 | Grossman et al. |
| 5,221,838 A | * | 6/1993 | Gutman et al. ............. 235/379 |
| D340,472 S | | 10/1993 | Chriest et al. |
| 5,299,295 A | | 3/1994 | Kim et al. |
| 5,602,963 A | | 2/1997 | Bissonnette et al. |
| 5,748,737 A | * | 5/1998 | Daggar ....................... 235/379 |
| 5,930,700 A | * | 7/1999 | Pepper et al. .......... 379/211.02 |
| 5,974,238 A | * | 10/1999 | Chase, Jr. ............. 395/200.78 |
| 6,016,476 A | * | 1/2000 | Maes et al. ..................... 705/1 |
| 6,164,531 A | * | 12/2000 | Harris et al. ................... 235/38 |
| 6,305,603 B1 | * | 10/2001 | Grunbok et al. ............. 235/379 |
| 6,307,751 B1 | * | 10/2001 | Bodony et al. .............. 361/681 |
| 6,336,586 B1 | * | 1/2002 | Shriver ....................... 235/380 |

* cited by examiner

Primary Examiner—Tālivaldis Ivars Šmits
Assistant Examiner—Angela A. Armstrong

(57) ABSTRACT

An electronic financial accounting system for tracking financial transactions, applying electronic coupons, and facilitating updating of financial records, includes a financial record keeping unit having ports for battery power, hardwire inputting and outputting of data, and infrared transfer of data. Multiple functional keys and a scroll key are used for controlling functions displayed on a display screen. One of the functional keys being an update key wherein stored financial records of a financial record keeping unit are compared to financial records of an input source for identification of financial records recorded in the input unit since a last update of said stored financial records. The unit is designed to interact with other machines such as home computers and cash registers for automatically debiting accounts, tracking and updating financial records, and automatically applying electronic coupons to purchases. Speech recognition is used for permitting oral input of transaction data and for speech print recognition of a user password to prevent unauthorized use.

13 Claims, 6 Drawing Sheets

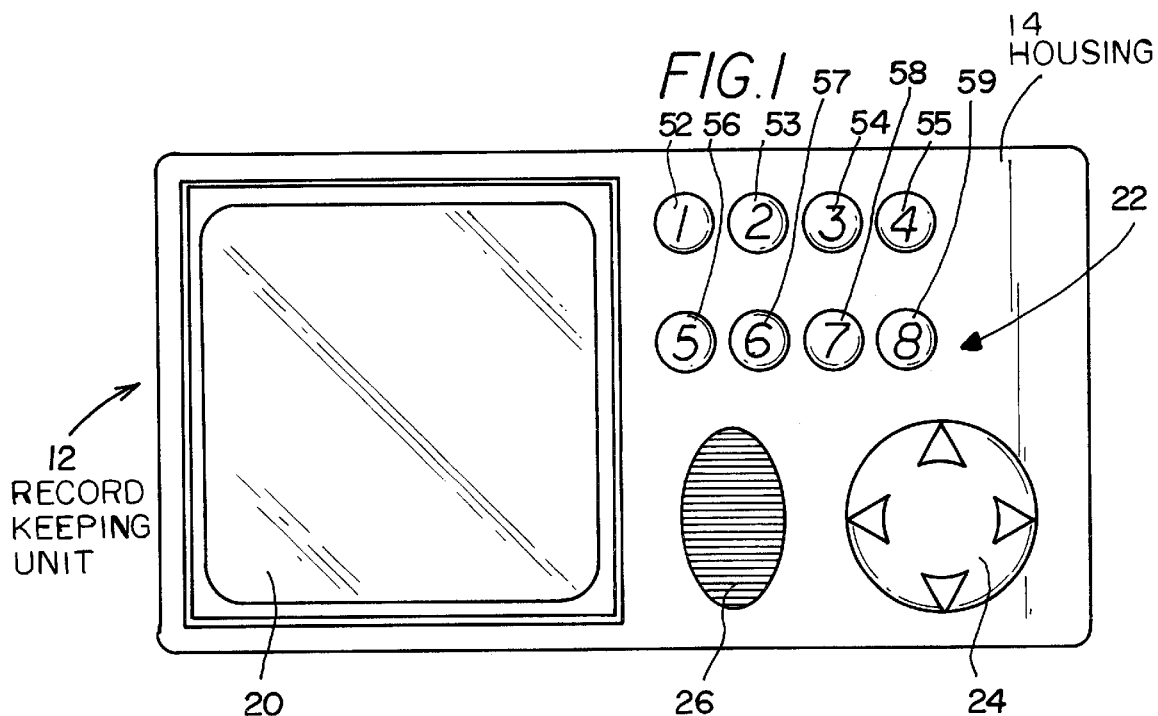
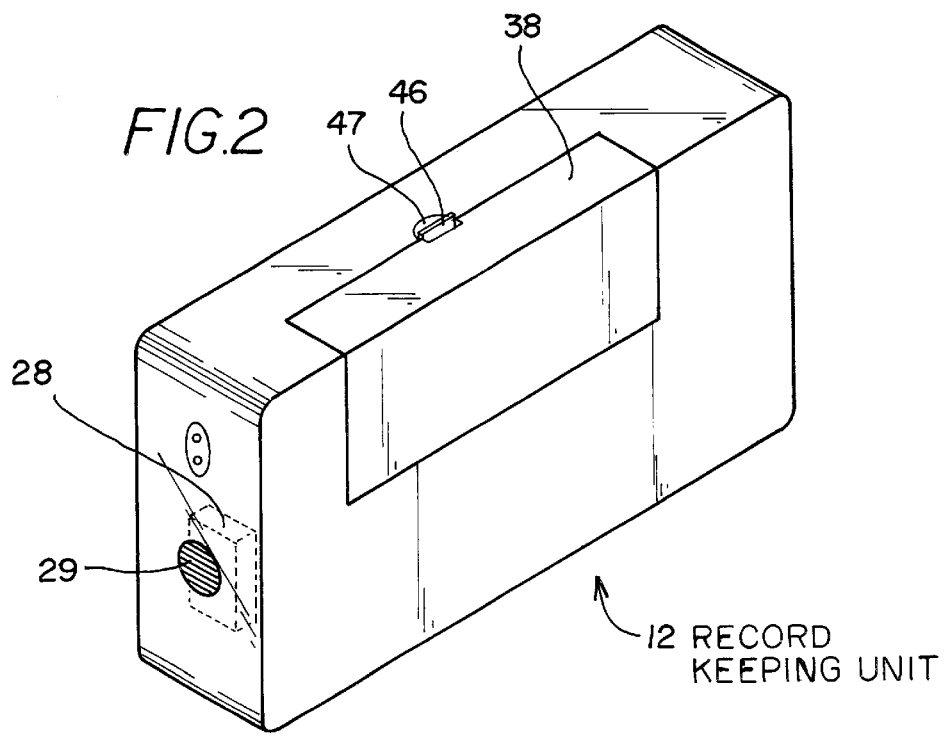

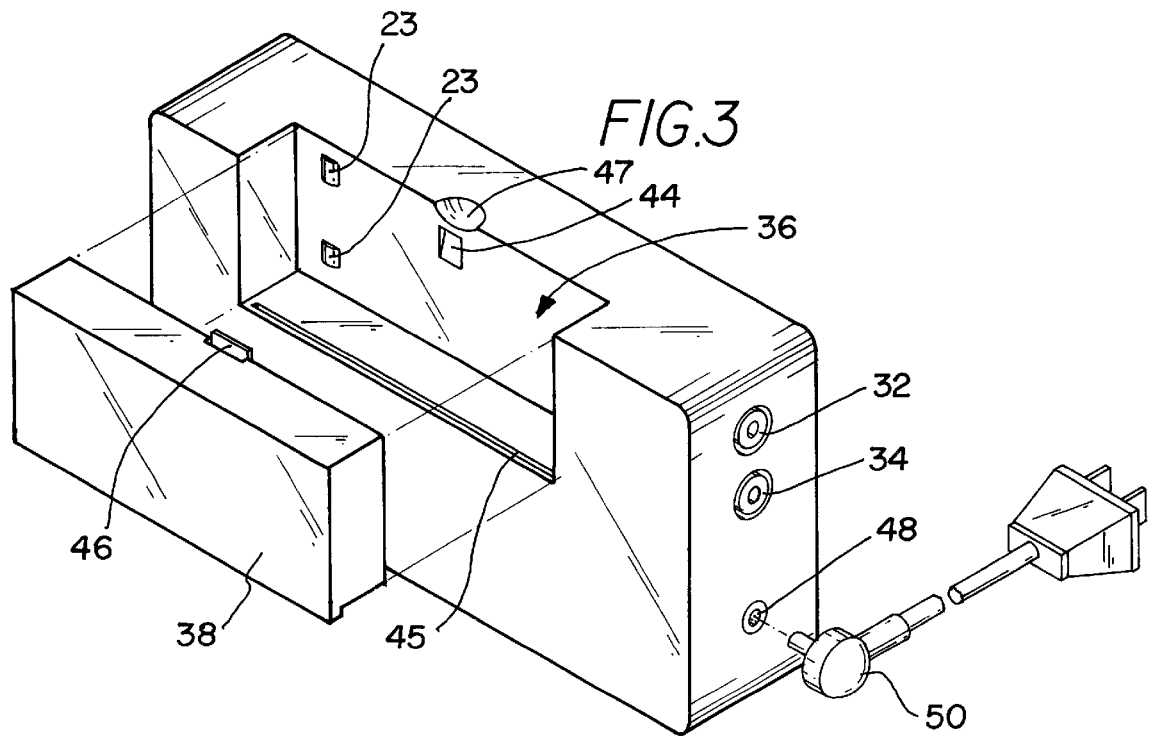
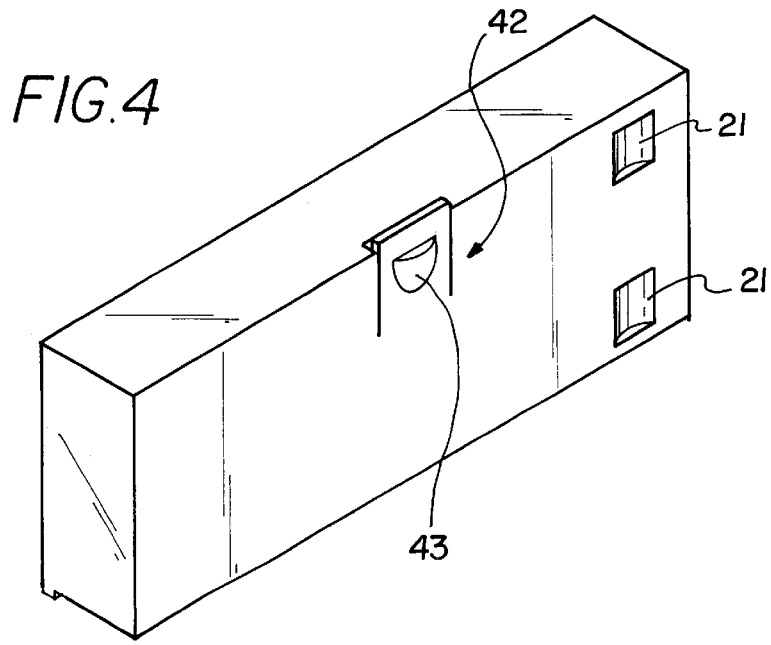

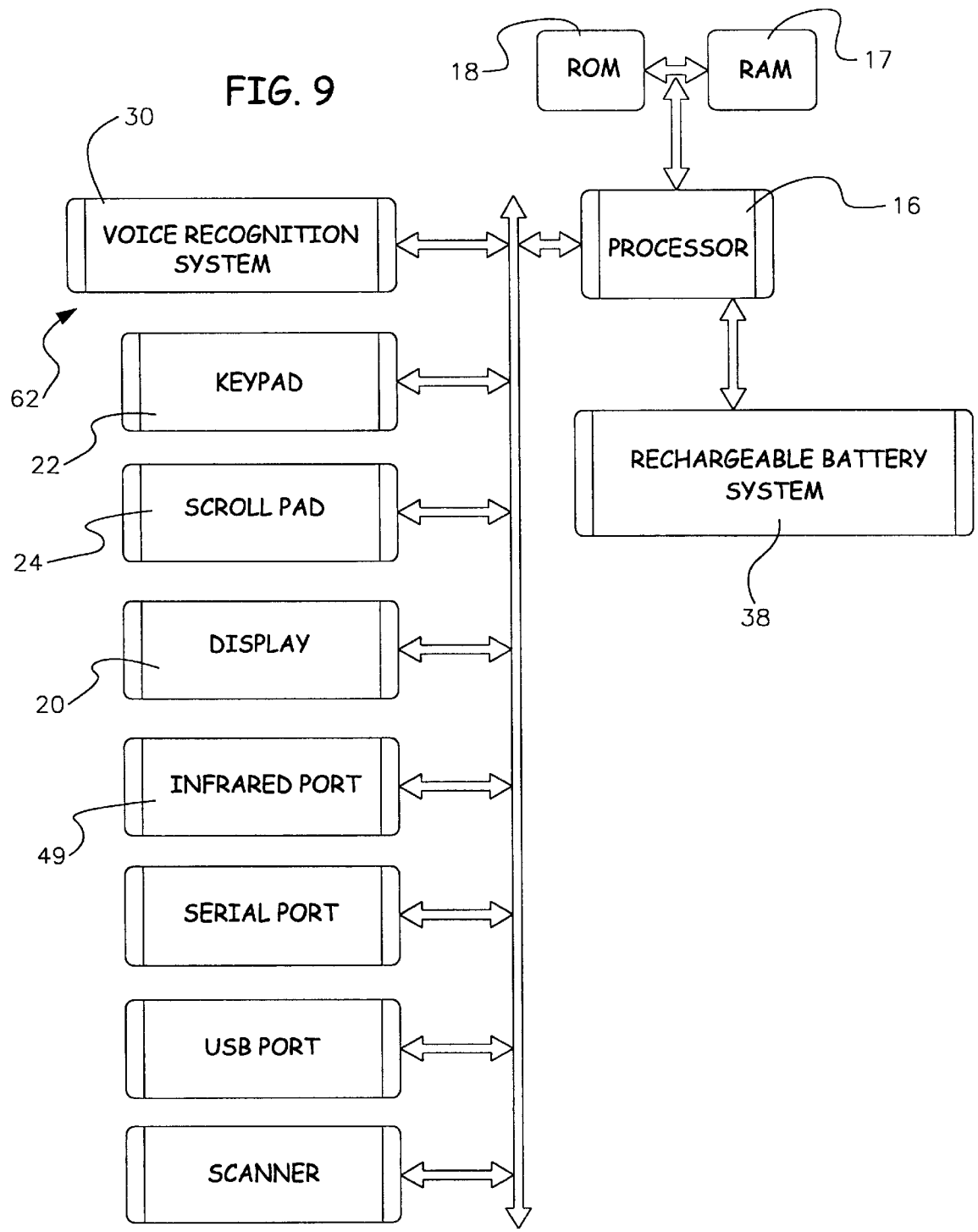

ELECTRONIC FINANCIAL ACCOUNTING SYSTEM

BACKGROUND OF THE INVENTION

1. Field of the Invention

The present invention relates to electronic devices and more particularly pertains to a new electronic financial accounting system for tracking financial transactions, applying electronic coupons, and facilitating updating of financial records.

2. Description of the Prior Art

The use of electronic devices is known in the prior art. More specifically, electronic devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,724,527; U.S. Pat. No. 5,602,963; U.S. Pat. No. 4,222,109; U.S. Pat. No. 4,910,696; U.S. Pat. No. 5,299,295; and U.S. Pat. No. Des. 340,472.

While these devices fulfill their respective, particular objectives and requirements the aforementioned patents do not disclose a new electronic financial accounting system. The inventive device includes a financial record keeping unit having ports for battery power, hardwire inputting and outputting data, and infrared transfer of data. Multiple functional keys and a scroll key are used for controlling functions displayed on a display screen. The unit is designed to interact with other machines such as home computers and cash registers for automatically debiting accounts, tracking and updating financial records, and automatically applying electronic coupons to purchases. Voice recognition is used for permitting oral input of transaction data and for voice print recognition of a user password to prevent unauthorized use.

In these respects the electronic financial accounting system according to the present invention substantially departs from the conventional concepts and designs of the prior art, and in so doing provides an apparatus primarily developed for the Purpose of tracking financial transactions applying electronic coupons, and facilitating updating of financial records.

SUMMARY OF THE INVENTION

In view of the foregoing disadvantages inherent in the known types of electronic devices now present in the prior art, the present invention provides a new electronic financial accounting system construction wherein the same can be utilized for tracking financial transactions, applying electronic coupons, and facilitating updating of financial records.

The general purpose of the present invention, which will be described subsequently in greater detail, is to provide a new electronic financial accounting system apparatus and method which has many of the advantages of the electronic devices mentioned heretofore and many novel features that result in a new electronic financial accounting system which is not anticipated, rendered obvious, suggested or even implied by any of the prior art electronic devices, either alone or in any combination thereof.

To attain this, the present invention generally comprises a financial record keeping unit having ports for battery power, hardwire inputting and outputting data, and infrared transfer of data. Multiple functional keys and a scroll key are used for controlling functions displayed on a display screen. The unit is designed to interact with other machines such as home computers and cash registers for automatically debiting accounts, tracking and updating financial records, and automatically applying electronic coupons to purchases. Voice recognition is used for permitting oral input of transaction data and for voice print recognition of a user password to prevent unauthorized use.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electronic financial accounting system apparatus and method which has many of the advantages of the electronic devices. mentioned heretofore and many novel features that result in a new electronic financial accounting system which is not anticipated, rendered obvious, suggested, or even implied by any of the prior art electronic devices, either alone or in any combination thereof.

It is another object of the present invention to provide a new electronic financial accounting system that may be easily and efficiently manufactured and marketed.

It is a further object of the present invention to provide a new electronic financial accounting system that is of a durable and reliable constructions.

An even further object of the present invention is to provide a new electronic financial accounting system which is susceptible of a low cost of manufacture with regard to both materials and labor, and which accordingly is then susceptible of low prices of sale to the consuming public, thereby making such electronic financial accounting system economically available to the buying public.

Still yet another object of the present invention is to provide a new electronic financial accounting system which provides in the apparatuses and methods of the prior art some of the advantages thereof, while simultaneously overcoming some of the disadvantages normally associated therewith.

Still another object of the present invention is to provide a new electronic financial accounting system for tracking financial transactions, applying electronic coupons, and facilitating updating of financial records.

Yet another object of the present invention is to provide a new electronic financial accounting system which includes a financial record keeping unit having ports for battery power, hardwire inputting and outputting data, and infrared transfer of data. Multiple functional keys and a scroll key are used for controlling functions displayed on a display screen. The unit is designed to interact with other machines such as home computers and cash registers for automatically debiting accounts, tracking and updating financial records, and automatically applying electronic coupons to purchases. Voice recognition is used for permitting oral input, of transaction data and for voice print recognition of a user password to prevent unauthorized use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of a financial record keeping unit of a new electronic financial accounting system according to the present invention.

FIG. 2 is a perspective end view of the present invention.

FIG. 3 is a perspective end view of the present invention.

FIG. 4 is a perspective view of the battery of the present invention.

FIG. 9 is a schematic diagram of the components of the record keeping unit of an embodiment of the present invention.

DESCRIPTION OF THE PREFERRED EMBODIMENT

Figure 5:
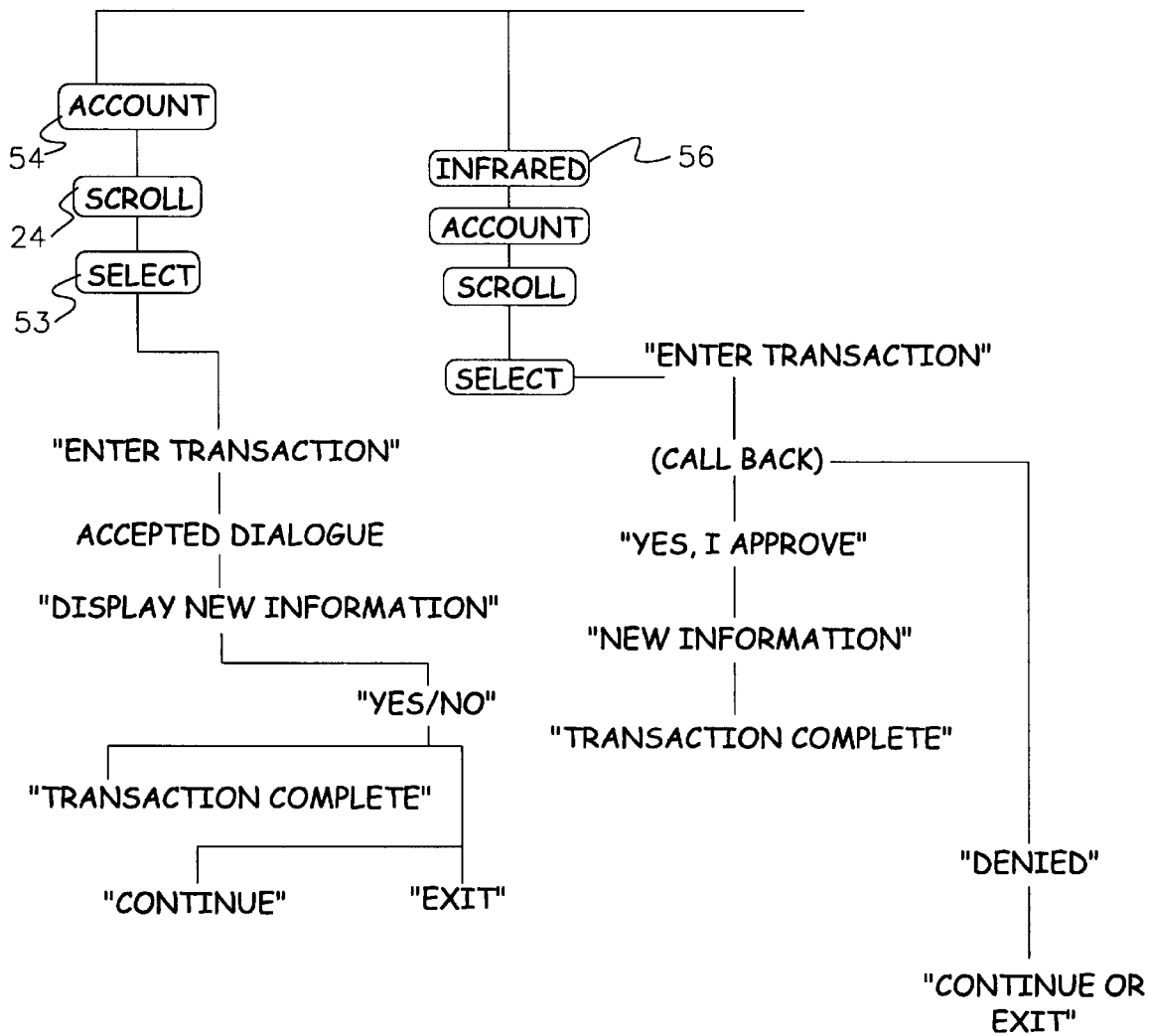
FIG. 5 is a partial schematic diagram of the functioning of the present invention.
Figure 6:
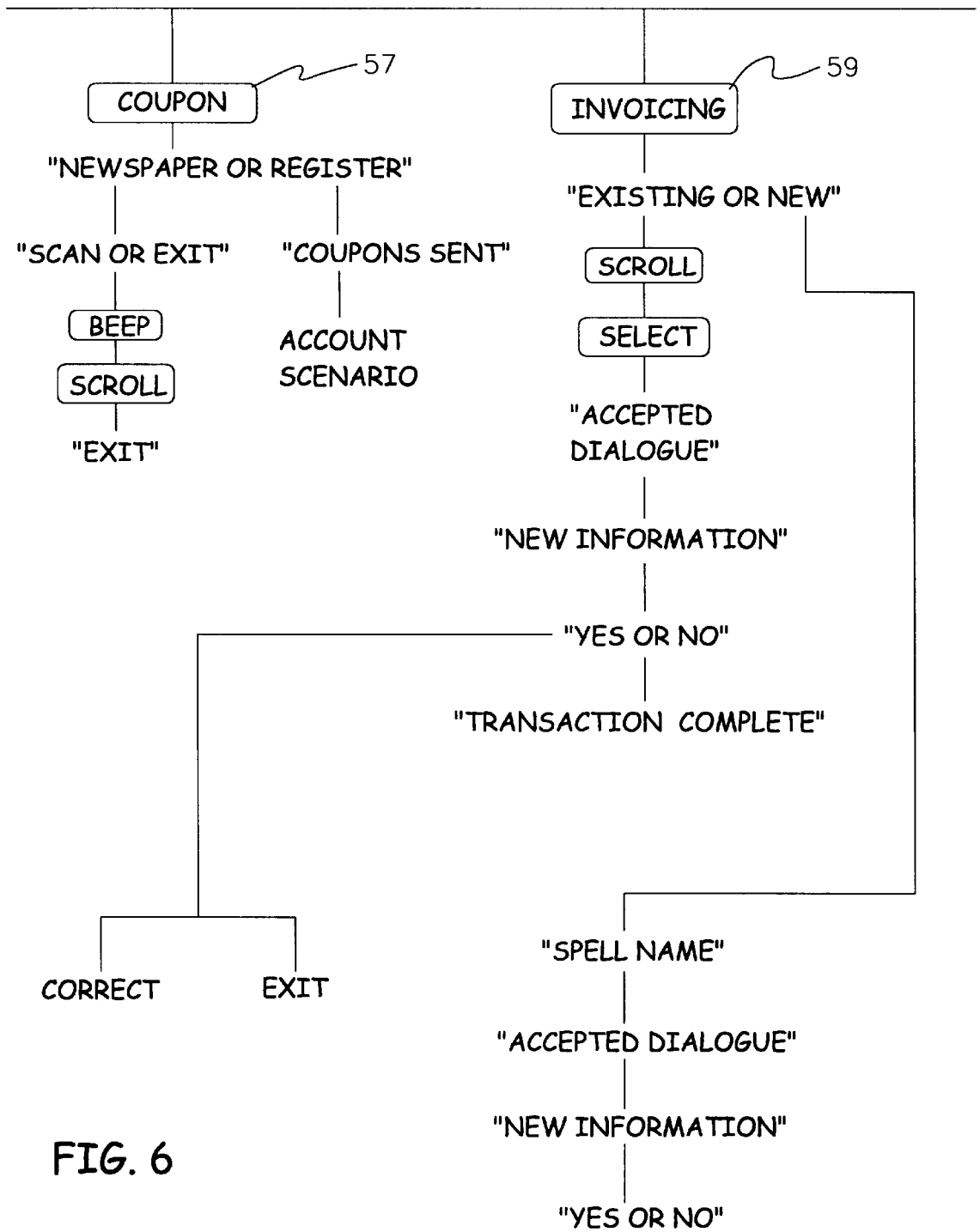
FIG. 6 is a partial schematic diagram of the functioning of the present invention.
Figure 7:
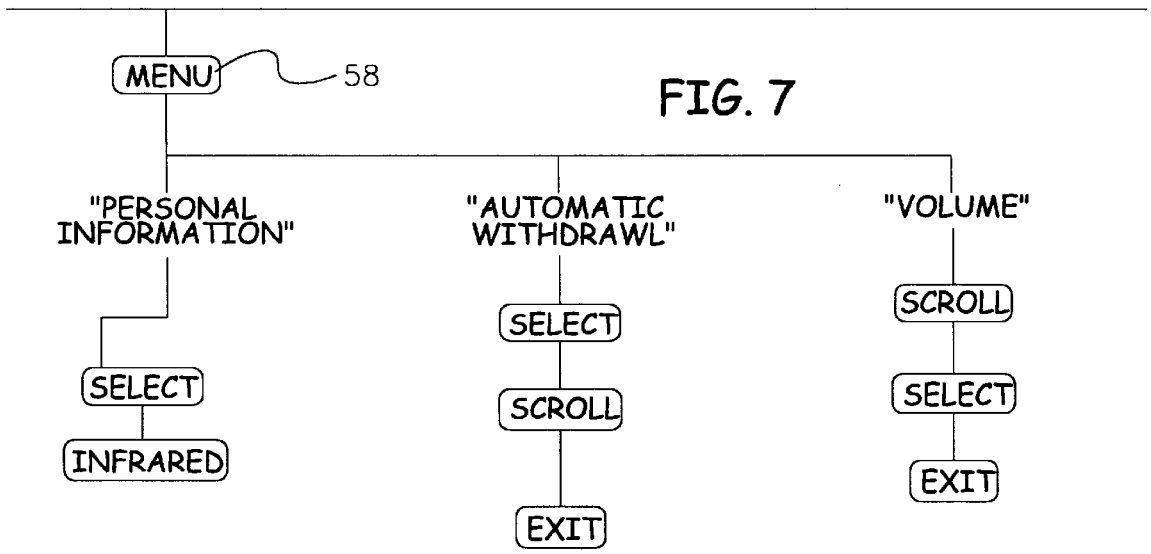
FIG. 7 is a partial schematic diagram of the functioning of the present invention.
Figure 8:
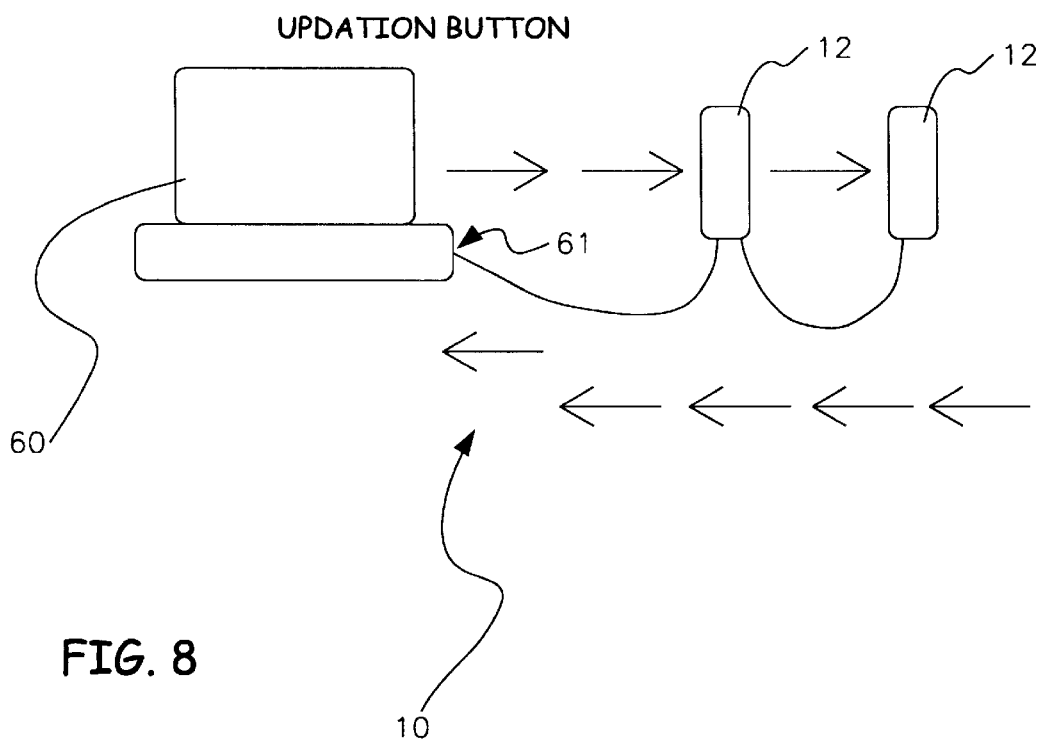
FIG. 8 is a schematic diagram of the interconnection of the present invention.

With reference now to the drawings, and in particular to FIGS. 1 through 9 thereof, a new electronic financial accounting system embodying the principles and concepts of the present invention and generally designated by the reference numeral 10 will be described.

As best illustrated in FIGS. 1 through 9, the electronic financial accounting system 10 generally comprises a financial record keeping unit 12 having a housing 14. A microprocessor 16 is positioned within an interior of said housing 14. The microprocessor 16 includes a memory including RAM memory storage 17 and ROM memory storage 18.

A display screen 20 is coupled to the housing 14 and is operationally coupled to the microprocessor 16 for displaying images transmitted from the microprocessor 16.

In an embodiment, eight functional keys 22 are coupled to the housing 14 and are operationally coupled to the microprocessor 16.

A scroll direction key 24 is coupled to the housing 14 and is also operationally coupled to the microprocessor for scrolling through the images displayed by the display screen 20.

A speaker 26 is coupled to the housing and is operationally coupled to the microprocessor 16 for producing sounds generated by the microprocessor 16. The sounds may include audio beeps to confirm pressing of a key, synthesized statements of amounts displayed on the di splay screen, or requests for confirmation of a displayed amount or transaction to be entered.

A microphone 28 is positioned within the interior of the housing 14 and is positioned proximate a microphone screen portion 29 of the housing for receiving spoken financial information or verbal confirmation of correct data from a user.

A voice recognition system 30 is operationally coupled to the microprocessor 16 for converting the spoken financial information into processable data for the microprocessor 16.

The housing 14 includes a data input port 32 operationally coupled to the microprocessor 16 for facilitating hardwired inputting of financial data to the microprocessor. The housing also includes a data output port 34 that is operationally coupled to the microprocessor 16 for facilitating hardwired exporting of financial data from the microprocessor 16 to another machine such as a home computer or a cash register.

The housing is shaped to include a battery docking portion 36. A rechargeable battery 38 is engageable to the battery docking portion 36. The battery 38 includes a retaining ridge 40 and a battery clip 42. The battery clip 42 includes a protrusion 43. The housing 14 includes a protrusion receiving well 44 and a groove 45. The groove 45 is designed for receiving the retaining ridge 40 positioned such that the battery 38 is engageable to the housing 14 when the retaining ridge 40 is inserted into the groove 45 and the protrusion 43 of the battery clip 42 is positioned to engage the protrusion receiving well 44. On an embodiment, the battery 38 includes a tab 46 extending from the battery clip 42 and the housing 14 includes a depression 47 for facilitating disengagement of the battery clip protrusion 43 from the clip receiver 44.

Also in an embodiment, the battery 38 includes a pair of outwardly extending contacts 21. The housing 14 includes a corresponding pair of concave contacts 23 positioned to receive the contacts 21 when the battery 38 is engaged to the housing 14.

An infrared information transfer port 49 is provided for transmitting and receiving infrared data transmissions.

The housing 14 includes an AC power input port 48 electronically coupled to the microprocessor 16. An AC power cord 50 is also provided for selectively coupling to the AC power input port 48 for providing power to the financial record keeping unit 12.

A first one of the functional keys 22 is a power key 52 for selectively activating the financial record keeping unit 12.

A second one of the functional keys 22 is a select key 53 whereby a highlighted function or action displayed on the display screen 20 is selectable by depressing the select key 53.

A third one of the functional keys 22 is an account information key 54. The account information key 54 is designed for displaying account information such as account number, balance, and the like on the display screen upon pressing of the account information key 54.

A fourth one of the keys 22 is an update key 55 wherein stored financial records of the financial record keeping unit 12 are compared to financial records of an input source such as a home computer or another financial record keeping unit 12 for identification of financial records recorded in the input source since the last update of the stored financial records. Thus, the stored financial records are altered to include the financial records recorded by the input source since the last update of the stored financial records. Thus a master record may be kept on one financials record keeping unit 12 or multiple financial record keeping units may be used and updated such that each unit includes all the transactions of the other units.

A fifth one of the functional keys 22 is an infrared transfer key 56 whereby infrared transmission of data is initiated upon. pressing of the infrared transfer key 56.

A sixth one of the functional keys 22 is a coupon key 57 for accessing coupon information stored in the memory of the microprocessor 16. The coupon key further is designed for transferring stored electronic coupon information to a store register operationally coupled to the financial record keeping unit 12 for automatically applying the stored electronic coupon information to a sale upon pressing of the coupon key 57. Thus coupons are automatically applied to purchases and deducted from the memory of the unit 12 such that paper coupons are obsolete.

A seventh one of the functional keys 22 is a menu display key 58 wherein a plurality of menus are sequentially displayable by pressing the menu display key 58 to progress from a displayed menu to a "next" menu in the sequence of menus. Once the desired menu is displayed, the scroll key 24 may be used to select a desired function or item on that menu.

An eighth one of the plurality of functional keys 22 may be an invoicing key 59 for directly accessing information stored in the memory for generating an invoice for a transaction.

In an embodiment, the unit 12 is connectable to a computer system 60 through a USB port 61 for simplifying interconnection and data transfer.

A password protection system 62 using voice recognition as is now known is provided wherein a user must speak a user defined password into the microphone after pressing the power key 52 before the microprocessor will accept input from any other of the functional keys 22.

In use, the financial record keeping unit 12 has multiple uses for tracking, recording, applying coupons, and communicating with computers such that theoretically, use of the unit 12 could allow a user to transact all financial business without the need for carrying any money. The user may record currency based transaction verbally by stating the transaction data into the microphone. For example, the user may state "withdrawal five dollars for groceries", the unit 12 will display the transaction and either audibly or visually request confirmation. Upon receipt of confirmation, the transaction will be recorded into the memory.

By interconnecting multiple units or one unit with a home computer, financial records can be automatically updated using only the update key. This process facilitates responsible use and accurate tracking of financial assets in a jointly held account wherein each person that has access to the account has their own unit 12 and the joint owners of the account regularly update their respective units.

The multiple data transfer ports permit interconnection and communication with cash registers in the marketplace. Thus, transactions may be calculated, including coupon deductions, automatically so that only confirmation needs to be given to complete the financial transaction.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the. art, it is not desired to limit the invention to the exact construction and operation shown and described, and accordingly, all suitable modifications and equivalents may be resorted to, falling within the scope of the invention.

I claim:

1. An electronic financial accounting system comprising:

a financial record keeping unit having a housing;

a microprocessor positioned within an interior of said housing;

said microprocessor having a memory including RAM memory storage and ROM memory storage;

a display screen coupled to said housing, said display screen being operationally coupled to said microprocessor for displaying images transmitted from said microprocessor;

a plurality of functional keys coupled to said housing, said function keys being operationally coupled to said microprocessor;

a scroll direction key coupled to said housing, said scroll direction key being operationally coupled to said microprocessor for scrolling through said images displayed by said display screen;

a speaker coupled to said housing, said speaker being operationally coupled to said microprocessor for producing sounds generated by said microprocessor;

a microphone positioned within said interior of said housing, said microphone being positioned proximate a microphone screen portion of said housing for receiving spoken financial information from a user;

a speach recognition system operationally coupled to said microprocessor for converting said spoken financial information into processable data for said microprocessor;

said housing having a data input port operationally coupled to said microprocessor for facilitating hardwired inputting of financial data to said microprocessor;

said housing having a data output port operationally coupled to said microprocessor for facilitating hardwired exporting of financial data from said microprocessor;

one of said functional keys being an update key wherein stored financial records of said financial record keeping unit are compared to financial records of an input source for identification of financial records recorded in the input unit since a last update of said stored financial records; and said stored financial records being altered to include said financial records recorded by said input unit since the last update of said stored financial records.

2. The electronic financial accounting system of claim 1, further comprising:

said housing being shaped to include a battery docking portion; and a rechargeable battery engageable to said battery docking portion.

3. The electronic financial accounting system of claim 1, further comprising:

an infrared information transfer port for transmitting and receiving infrared data transmissions.

4. The electronic financial accounting system of claim 1, further comprising:

said housing including an AC power input port electronically coupled to said microprocessor; and an AC power cord for selectively coupling to said AC power input port providing power to said financial record keeping unit.

5. The electronic financial accounting system of claim 1, further comprising:

one of said functional keys being a power key for selectively activating said financial record keeping unit.

6. The electronic financial accounting system of claim 5, further comprising:

a password protection system wherein a user must speak a user defined password into said microphone after pressing said power key before said microprocessor will accept input from any other of said functional keys.

7. The electronic financial accounting system of claim 1, further comprising:

one of said functional keys being a select key whereby a highlighted function displayed on said display screen is selectable by depressing said select key.

8. The electronic financial accounting system of claim 1, further comprising:

one of said functional keys being an account information key, whereby account information is displayed on said display screen upon pressing of said account information key.

9. The electronic financial accounting system of claim 1, further comprising:

one of said functional keys being an infrared transfer key whereby infrared transmission of data is initiated upon pressing of said infrared transfer key.

10. The electronics financial accounting system of claim 1 further comprising:

one of said functional keys being a menu display key wherein a plurality of menus are sequentially displayable by pressing said menu display key to progress from a displayed menu to a next menu in said plurality of menus.

11. The electronic financial accounting system of claim 1, further comprising:

a main computer system having a USB port, said financial record keeping unit having a USB port for selectively coupling to said USB port of said main computer system; and a software program for tracking and correlating financial records of multiple said financial record keeping units.

12. The electronic financial accounting system of claim 1, further comprising:

one of said plurality of functional keys being an invoicing key for directly accessing information for generating an invoice for a transaction.

13. The electronic financial accounting system of claim 1, further comprising:

said housing being shaped to include a battery docking portion;

a rechargeable battery engageable to said battery docking portion;

a battery having a retaining ridge and a battery clip, said battery clip having a protrusion;

said housing having a protrusion receiving well and a groove, said groove being for receiving said retaining ridge whereby said battery is engageable to said housing when said retaining ridge is inserted into said groove and said protrusion of said battery clip is positioned to engage said protrusion receiving well;

said battery having a tab extending from said battery clip for facilitating disengagement of said battery clip protrusion from said clip receiver;

an infrared information transfer port for transmitting and receiving infrared data transmissions;

said housing including an AC power input port electronically coupled to said microprocessor;

an AC power cord for selectively coupling to said AC power input port providing power to said financial record keeping unit;

a second one of said functional keys being a power key for selectively activating said financial record keeping unit;

a third one of said functional keys being a select key whereby a highlighted function displayed on said display screen is selectable by depressing said select key;

a fourth one of said functional keys being an account information key, whereby account information is displayed on said display screen upon pressing of said account information key;

a fifth one of said functional keys being an infrared transfer key whereby infrared transmission of data is initiated upon pressing of said infrared transfer key;

a sixth one of said functional keys being a coupon key for accessing coupon information stored in said memory of said microprocessor, said coupon key further being adapted for transferring stored electronic coupon information to a store register operationally coupled to said financial record keeping unit for automatically applying said stored electronic coupon information to a sale upon pressing of said coupon key;

a seventh one of said functional keys being a menu display key wherein a plurality of menus are sequentially displayable by pressing said menu display key to progress from a displayed menu to a next menu in said plurality of menus;

an eighth one of said plurality of functional keys being an invoicing key for directly accessing information for generating an invoice for a transaction;

a main computer system having a USB port;

said financial record keeping unit having a USB port for selectively coupling to said USB port of said main computer system;

a software program for tracking and correlating financial records of multiple said financial record keeping units; and a password protection system wherein a user must speak a user defined password into said microphone after pressing said power key before said microprocessor will accept input from any other of said functional keys.

\* \* \* \* \*